United States Patent
Coon et al.

(10) Patent No.: US 9,331,769 B2
(45) Date of Patent: May 3, 2016

(54) WIRELESS COMMUNICATIONS APPARATUS AND METHOD

(75) Inventors: Justin Coon, Bristol (GB); Magnus Stig Torsten Sandell, Bristol (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 997 days.

(21) Appl. No.: 12/917,782

(22) Filed: Nov. 2, 2010

(65) Prior Publication Data

US 2011/0128924 A1    Jun. 2, 2011

(30) Foreign Application Priority Data

Nov. 13, 2009 (GB) .................................. 0919962.1

(51) Int. Cl.
 *H04W 4/00* (2009.01)
 *H04B 7/06* (2006.01)
 *H04L 5/00* (2006.01)

(52) U.S. Cl.
 CPC .............. *H04B 7/0691* (2013.01); *H04B 7/068* (2013.01); *H04L 5/0016* (2013.01)

(58) Field of Classification Search
 None
 See application file for complete search history.

(56) References Cited

U.S. PATENT DOCUMENTS

| | | | |
|---|---|---|---|
| 7,212,793 B2 * | 5/2007 | Kogawa et | 455/132 |
| 2002/0164968 A1 * | 11/2002 | Crawford | H04B 7/0811 |
| | | | 455/277.1 |
| 2006/0034382 A1 * | 2/2006 | Ozluturk et al. | 375/267 |
| 2008/0075187 A1 * | 3/2008 | Sutskover | H04B 7/0691 |
| | | | 375/267 |
| 2008/0136735 A1 * | 6/2008 | Jin | H01Q 3/26 |
| | | | 343/893 |
| 2008/0232325 A1 * | 9/2008 | Mehta | H04B 7/061 |
| | | | 370/332 |
| 2009/0322613 A1 * | 12/2009 | Bala | H04B 7/022 |
| | | | 342/373 |

FOREIGN PATENT DOCUMENTS

| | | |
|---|---|---|
| JP | 2000-209145 | 7/2000 |
| JP | 2008-510376 | 4/2008 |

OTHER PUBLICATIONS

Notice of Reasons for Rejection issued Jun. 26, 2012 in Japanese Patent Application No. 2010-254386 (English translation only).

Hongyuan Zhang, et al., "Transmit Antenna Selection in MIMO-OFDM Systems: Bulk Versus Per-tone Selection", Communications, 2008, ICC'08, IEEE International Conference on May 2008, pp. 4371-4375.

* cited by examiner

*Primary Examiner* — John Blanton
*Assistant Examiner* — Thinh Tran
(74) *Attorney, Agent, or Firm* — Oblon, McClelland, Maier & Neustadt, L.L.P

(57) ABSTRACT

According to one embodiment, antenna allocation or selection in a multi-antenna wireless communications device can be performed at a receiver or an emitter of a wireless communications signal. Selection takes place on the basis of antenna and frequency. Antenna selection in a disclosed embodiment involves a combination of bulk and per tone antenna selection.

11 Claims, 9 Drawing Sheets

WIRELESS COMMUNICATIONS APPARATUS AND METHOD

FIELD

Embodiments described herein relate generally to antenna selection in wireless communications systems, with particular, but not exclusive, application to orthogonal frequency division multiplexing (OFDM) systems.

BACKGROUND

Antenna selection in OFDM systems is a powerful technique for exploiting spatial diversity when limited channel state information (CSI) is available at the transmitter. Conventionally, antenna selection methods in OFDM fall into two categories: 1) bulk selection, whereby one or more antennas out of the total available set are used for transmission and/or reception for all frequencies, and 2) per-tone selection, which provides an additional degree of freedom that allows the antenna selection to differ across the utilised bandwidth. Both techniques have advantages and disadvantages. For example, bulk selection requires very little CSI feedback and exploits fewer radio frequency (RF) chains than per-tone selection; however, per-tone selection is capable of achieving much higher coding gains than bulk selection, i.e., the bit-error rate (BER) for per-tone selection is significantly lower than for bulk selection.

DETAILED DESCRIPTION

Figure 1:
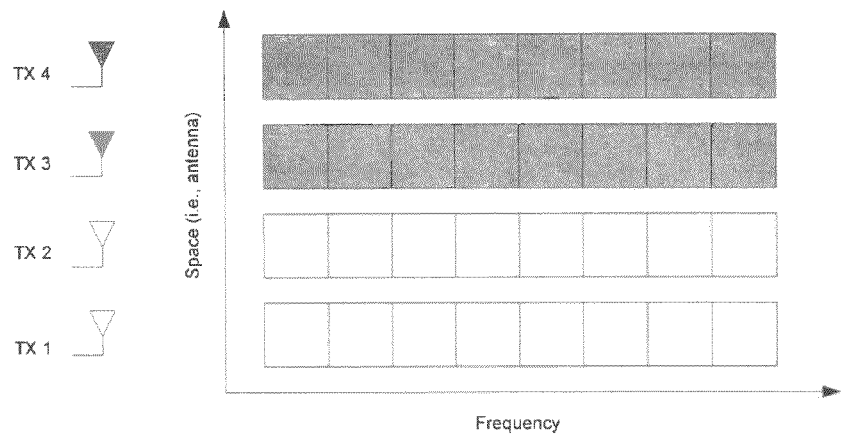
FIG. 1 is a graph of transmit antenna selection in accordance with a bulk allocation arrangement.
Figure 2:
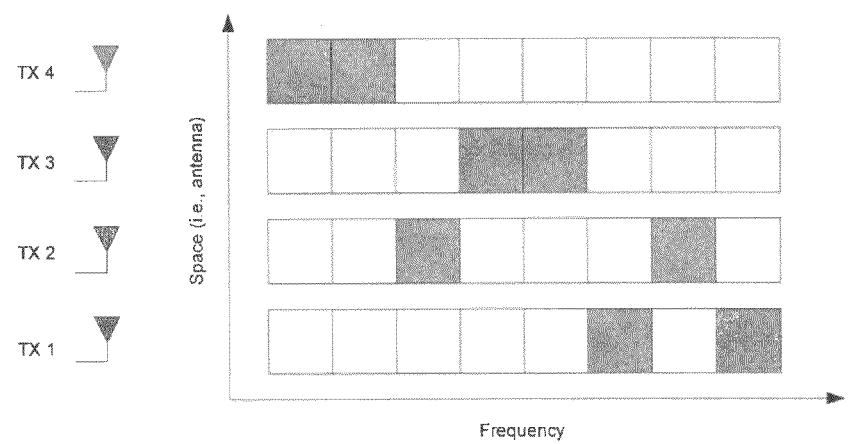
FIG. 2 is a graph of antenna allocation in accordance with per-tone antenna selection.

FIGS. 1 and 2 appended hereto show graphs of antenna activity over frequency on a four antenna transmitter (named TX1 to TX4). Frequency slots, or subcarriers are defined as equally spaced frequency ranges within a used spectrum. FIG. 1 illustrates a bulk antenna selection arrangement. In this arrangement, antennas TX3 and TX4 both transmit on all frequencies. Thus, only two RF chains are required for this scenario.

In contrast, FIG. 2 shows a per-tone antenna selection arrangement, in which all transmitters convey information. However, only one transmitter is active on any given subcarrier. This therefore requires four RF chains. It will be noted by the reader that these selection schemes can be performed at the receiver instead of the transmitter, or indeed at both the transmitter and the receiver.

For all antenna selection systems, some degree of channel state information (CSI) must be available at the transmitter (if transmit antenna selection is performed) or at the receiver (if receive antenna selection is performed). In particular, this information can be estimated using known channel estimation methods and either conveyed explicitly to the antenna selection modules in the transceiver or, in the case of transmit antenna selection, used to calculate the subcarrier/antenna allocation, which is then explicitly conveyed to the transmitter for implementation.

For systems employing transmit antenna selection and time-division duplex (TDD) communication, CSI can be acquired simply at the transmitter, to enable antenna selection, by exploiting the assumed reciprocity in the channel to estimate the necessary CSI from the incoming signal. Reciprocity can reasonably be assumed in many circumstances. It will be appreciated that reciprocity cannot always be assumed. For example, calibrations may need to be carried out to alleviate 'distortion' caused by imperfect antennas and RF front ends. Also, as the reader will understand, reciprocity does not apply to frequency division duplex (FDD) transmissions.

In frequency division duplex (FDD) systems, an explicit feedback channel is generally required, in order to supply the transmitter with the required information. It should be noted that only partial knowledge of the CSI is required in order to perform antenna selection; in particular, the amplitude of the channel frequency response must be estimated or known, whereas the phase information is irrelevant in most scenarios.

In the most general case, antenna selection can be performed such that a single antenna is chosen for transmission out of the set of M antennas, or a subset of L antennas are chosen out of M. The former approach is herein labelled 'single-antenna selection', while the latter is termed 'subset selection'. Both approaches can be employed in bulk selection or per-tone selection scenarios.

A method of per-tone 'antenna puncturing' has previously been disclosed whereby data is first mapped to M streams, which are forwarded to the M respective transmit antennas. Subsequently, some data symbols are removed, or equivalently 'transmitted' with zero power. This removal is known as 'puncturing', and is a common technique applied at the bit level with error-control coding. The resulting punctured signal resembles a per-tone antenna selection signal. However, antenna selection does not actually take place in this approach; instead, powerful error-correcting codes are utilised to recover the missing data at the receiver.

It has been shown that, while bulk selection is attractive in terms of complexity and diversity gain, the coding gain (and thus BER) of this scheme is poor relative to per-tone selection. On the other hand, per-tone selection requires M RF chains, which may be unacceptable in some practical scenarios.

According to one embodiment, a wireless communications device comprises a plurality of antennas and operable to emit a frequency multiplexed signal from one or more of said antennas over a communications channel in use, and comprising allocation means operable to allocate said signal to said antennas and with respect to frequency, said allocation means being operable to allocate said signal to said antennas through a combination of bulk and per-tone antenna allocation.

According to another embodiment, a wireless communications device comprises a plurality of antennas and operable to receive a frequency multiplexed signal at said antennas over a communications channel in use, and comprising antenna signal selection means operable to select antennas for processing of received signals and with respect to frequency, said selection means being operable to select processing of said signal to with respect to said antennas through a combination of bulk and per-tone antenna selection.

According to another embodiment, a method of allocating a frequency multiplexed signal to antennas of a multi antenna wireless communications device, comprises allocating said signal to said antennas with respect to frequency, said allocating being through a combination of bulk and per-tone antenna allocation.

According to another embodiment, a method of selecting use of antennas of a multi-antenna wireless communications device in receipt of a signal at said antennas, comprises selecting said antennas with respect to frequency, said selecting being through a combination of bulk and per-tone antenna allocation.

While the disclosure to this point, focuses on an emitter or a receiver of a communications signal, or a method corresponding to the same, it will be appreciated that suitable computer program product means could be provided to implement any of the disclosed embodiments. Such a computer program product could be in the form of a computer readable storage medium, or a receivable signal. The computer program product could be embodied in a pre-programmed device, such as a DSP, an FPGA or the like which, while not providing the full functionality of a receiver or emitter, would provide essential elements of such an embodiment.

Figure 3:
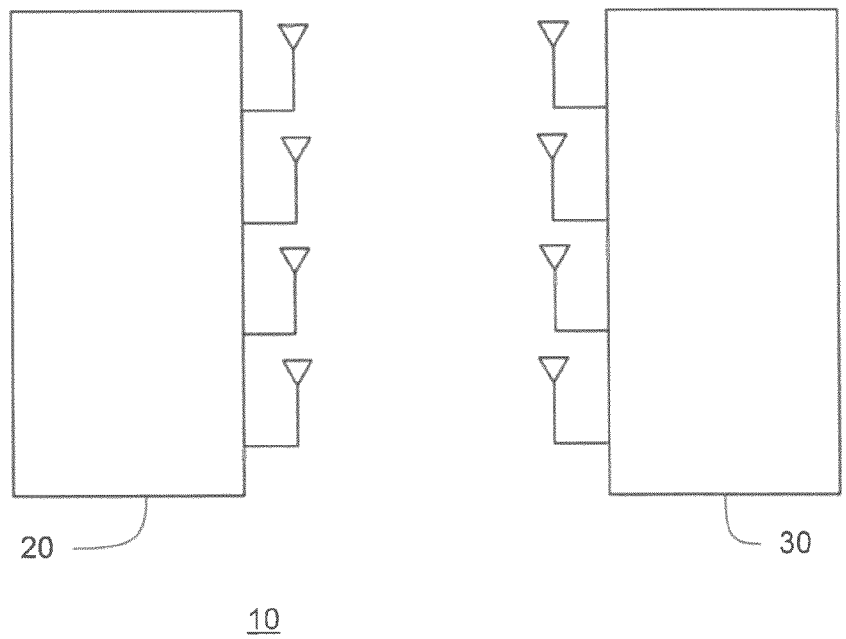
FIG. 3 is a schematic illustration of a simple communication system comprising two multi antenna transmit/receive devices.

In general terms, FIG. 3 illustrates a very schematic wireless communications system 10 comprising first and second transmit/receive devices 20, 30. Each of the transmit/receive devices 20, 30 is a multi antenna device, and antenna selection is well known to be a suitable way of making best use of the channel which can be formed between two such devices.

In accordance with this specific embodiment, bulk selection and per-tone selection are combined to yield a trade-off between complexity (which can be represented by the number of radio frequency (RF) chains required for implementation) and performance (which can be represented by bit error rate (BER)). In essence, this trade-off is achieved by constraining the overall transmission to be conveyed from a maximum of L≤M of the M available antennas, and performing a further per-tone selection using these L antennas.

Figure 4:
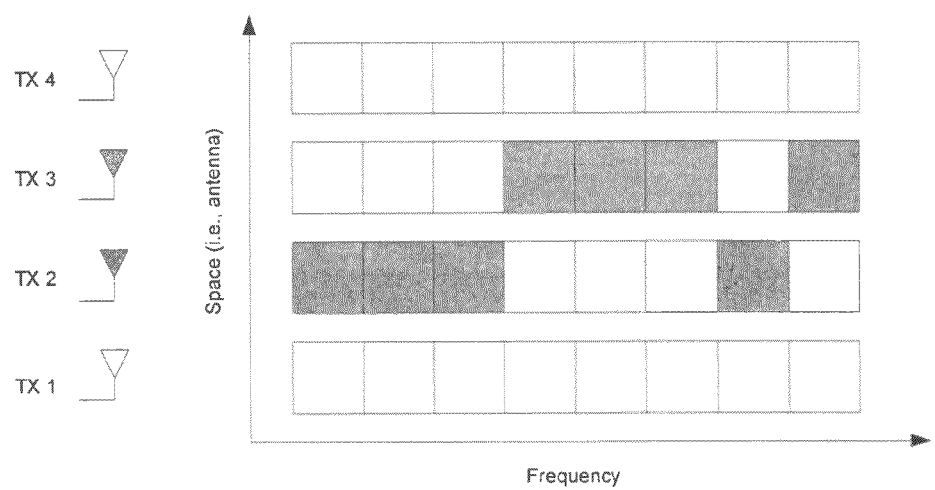
FIG. 4 is a graph illustrating antenna selection in accordance with a specific embodiment.

The above principle is illustrated by means of FIG. 4. FIG. 4 is a graph showing activity of antennas (labelled TX1 to TX4) against frequency. The available frequency band is subdivided into subcarriers, in accordance with usual practice. Those subcarriers active on any particular antenna are shown as shaded boxes in the graph.

It can be seen in FIG. 4 that transmitters TX2 and TX3 convey information, while TX1 and TX4 remain inactive. However, only one of TX2 and TX3 transmits on any given subcarrier.

Figure 5:
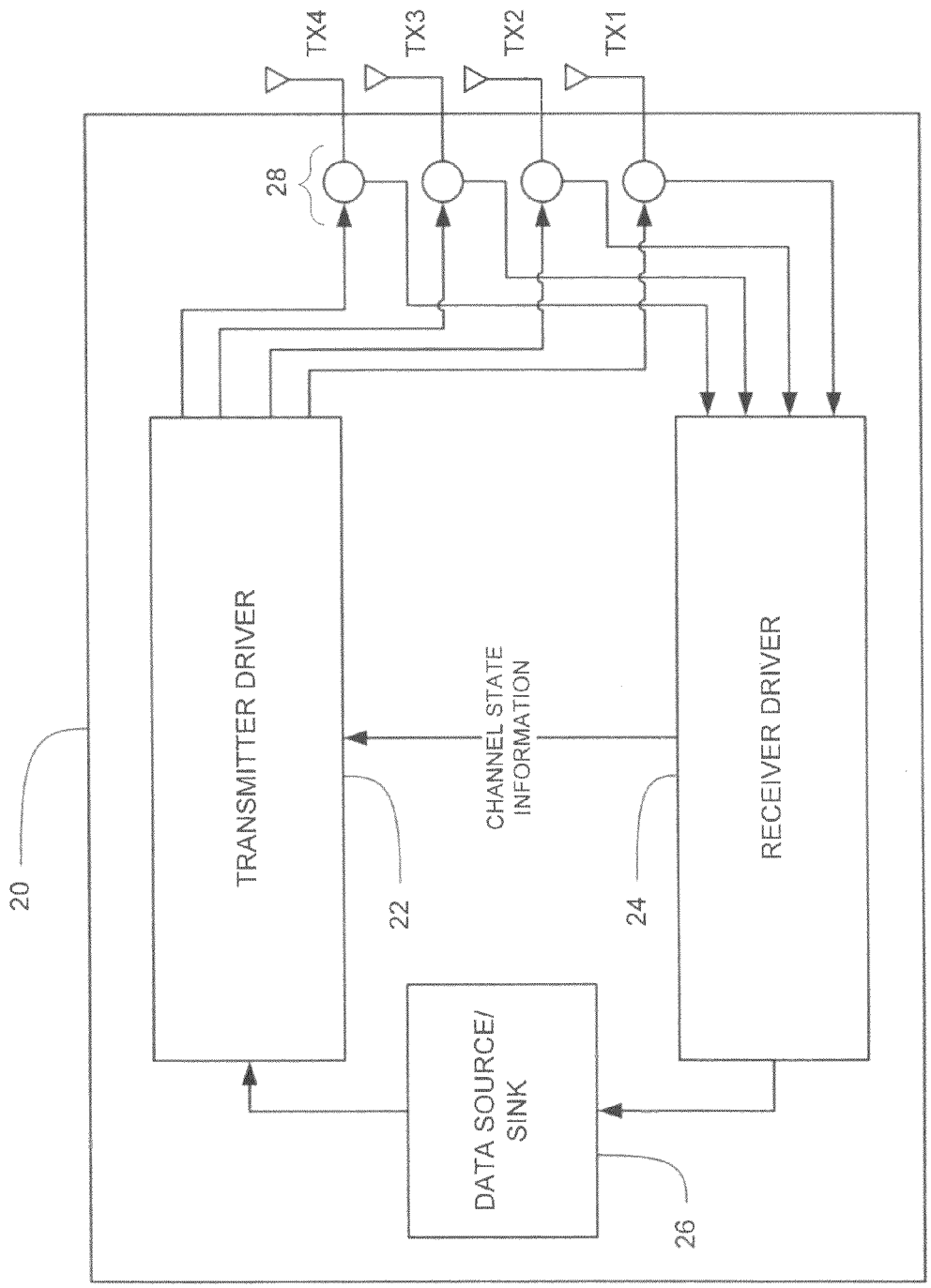
FIG. 5 is a schematic diagram of a transmit/receive device of FIG. 3.

Further illustrating this arrangement, FIG. 5 is a schematic diagram of the transmit/receive device 20 illustrated in FIG. 3. The device 20 comprises a transmitter driver 22 operable to receive data from a data source/sink 26 for transmission on the antennas TX1 to TX4 of the device 20. A receiver driver 24 receives and processes signals received on the same antennas and assist data to the data source sink 26 and channel state information to the transmitter driver 22. An array of suitable switches 28 is provided to enable the antennas to be used for both transmitting and receiving.

Figure 6:
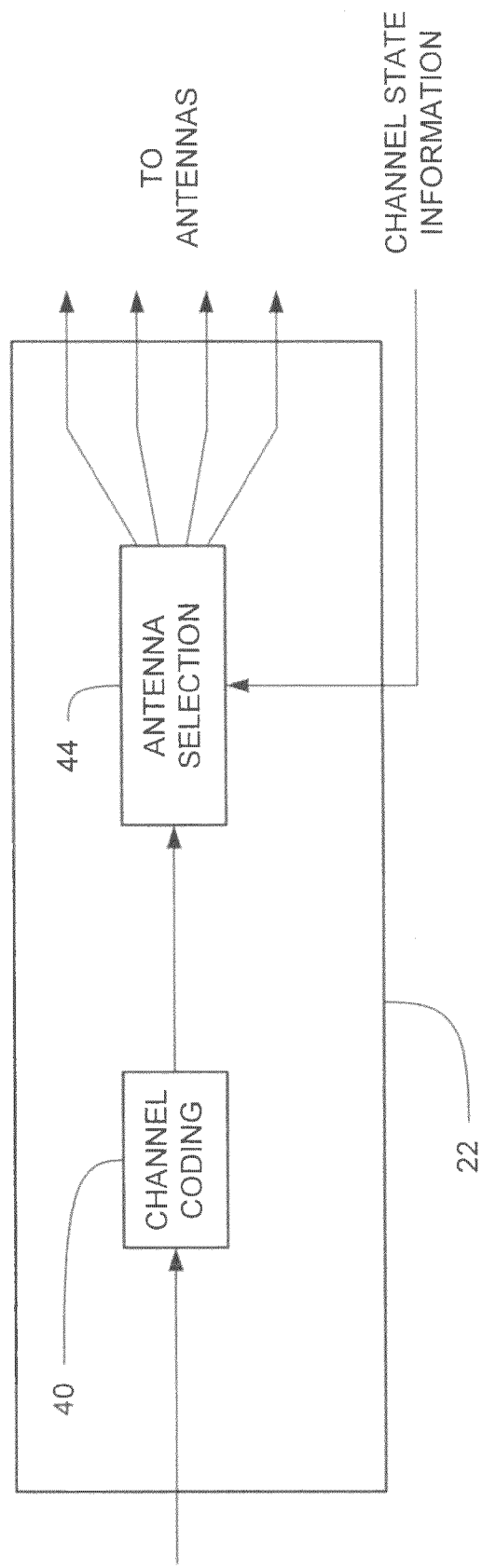
FIG. 6 is a schematic diagram of a transmitter driver of the transmit/receive device illustrated in FIG. 5.

As shown in FIG. 6, the transmitter driver 22 comprises channel coding 40, antenna selection 44 functional blocks operable to translate data to be transmitted to the signal applied to selected antennas at selected subcarrier frequencies. This is done on the basis of the channel state information fed to the antenna selection block 44.

In FIG. 4, and as illustrated in FIG. 3, it will be seen that M=4. Further, the process adopted in accordance with the specific embodiment imposes a single-antenna selection approach for the per-tone selection process. For the bulk selection process, L=2.

If, in an alternative arrangement, L=3, a subset selection strategy could have been chosen for the per-tone selection process, whereby two out of three antennas could be chosen for transmission on any given subcarrier.

Many combinations of bulk and per-tone selection exist, depending on the total number of antennas M and the number of available RF chains L.

It will be appreciated that transmit antenna selection is considered in the illustrated example above; the reader will no doubt understand that an embodiment could be implemented at a receiver or at both a transmitter and a receiver.

The bulk and per-tone selection procedures can be performed in a number of different ways. Four possibilities are outlined below, each of which follow principles of antenna selection in general, and based on the use of selection metrics.

In general, antenna selection procedures aim to optimise an objective. This objective could be maximisation of a given utility, such as signal-to-noise ratio (SNR), or minimisation of a given cost, such as bit error rate (BER). It will be appreciated by the reader that many appropriate objectives exist.

Indeed, for an embodiment comprising sequential bulk and per-tone selection described above, the objective governing bulk selection can be different from that governing the subsequent per-tone selection. In the following description of specific embodiments, reference is made to 'minimising a cost function'. This phrase does not preclude the maximisation of a utility function since the latter can always be re-expressed mathematically as a corresponding minimisation of a cost function, by using the negative of the utility function.

Finally, it will be appreciated that a skilled person could devise any number of possible objective functions, including but not limited to the following:
   minimising the maximum BER (over subcarriers);
   minimising the BER per subcarrier;
   minimising the average BER (over subcarriers);
   maximising the minimum SNR (over subcarriers);
   maximising the SNR per subcarrier;
   maximising the average SNR (over subcarriers);
   maximising the sum capacity (over subcarriers);
   minimising the error vector magnitude (EVM) of the signal after selection; and
   minimising the peak-to-average power ratio (PAPR) of the signal after selection.

Figure 7:
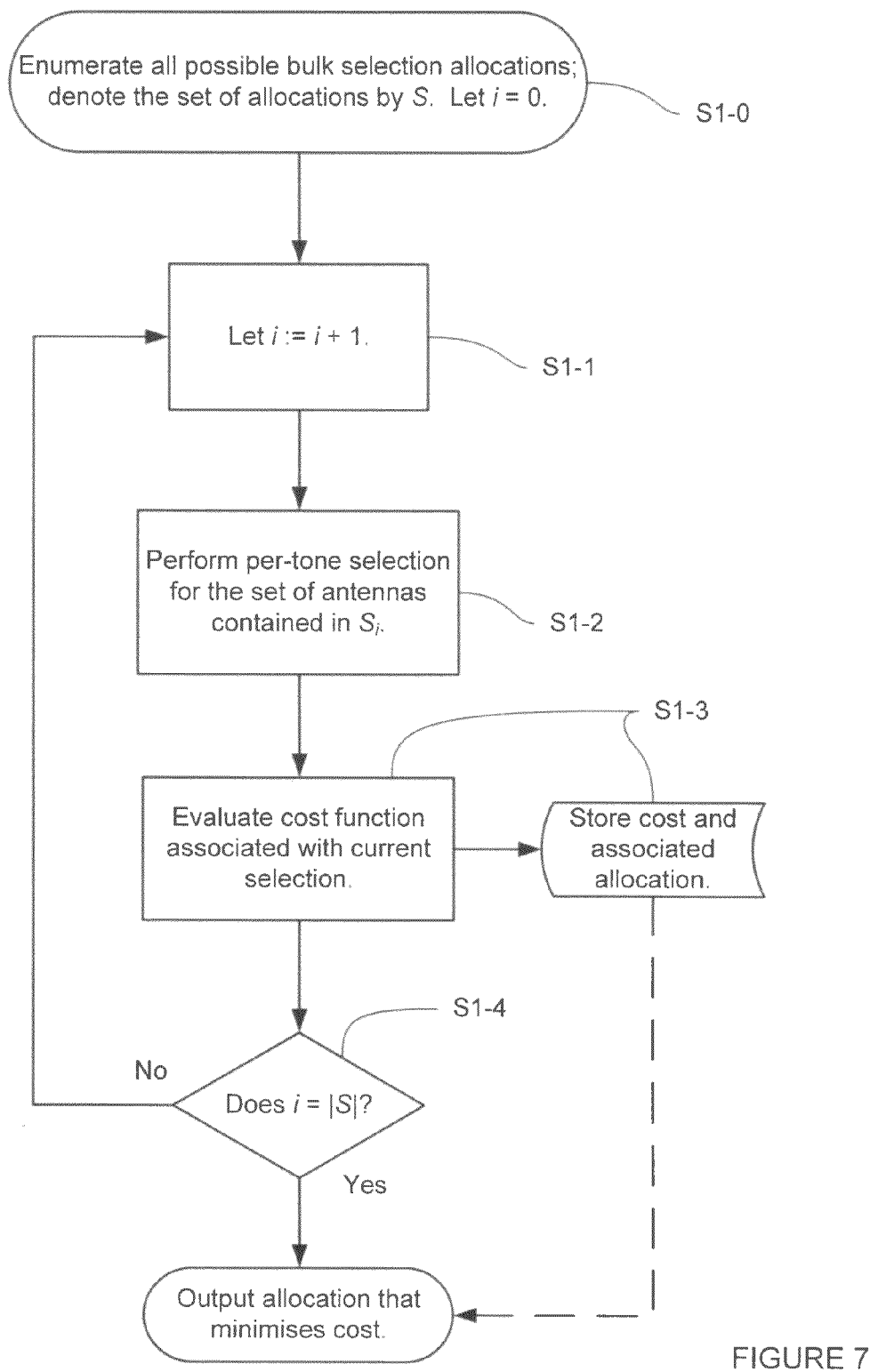
FIG. 7 is a flow diagram of a joint bulk and per-tone selection procedure in accordance with the abovementioned embodiment.

A first example of a process for bulk and per-tone selection will now be described, with reference to FIG. 7 of the drawings. This can be described as an optimal bulk and per-tone antenna selection.

In this example, the transmitter performs bulk and per-tone selection according to the following procedure:

S1-0) Initialisation: Given L and M, enumerate the $$\binom{M}{L}$$

possible bulk selection allocations, and let the set of these allocations be denoted by S, writing the i th element of the set as $S_i$. Initialise i=0.
S1-1) Assign i=i+1.
S1-2) Perform per-tone selection for the set of antennas contained in $S_i$.
S1-3) Evaluate the cost function related to the selection performed in step S1-2 and log this value.
S1-4) If i=|S|, stop and choose the allocation that minimises the cost function. Otherwise, go to step S1-1.

Figure 8:
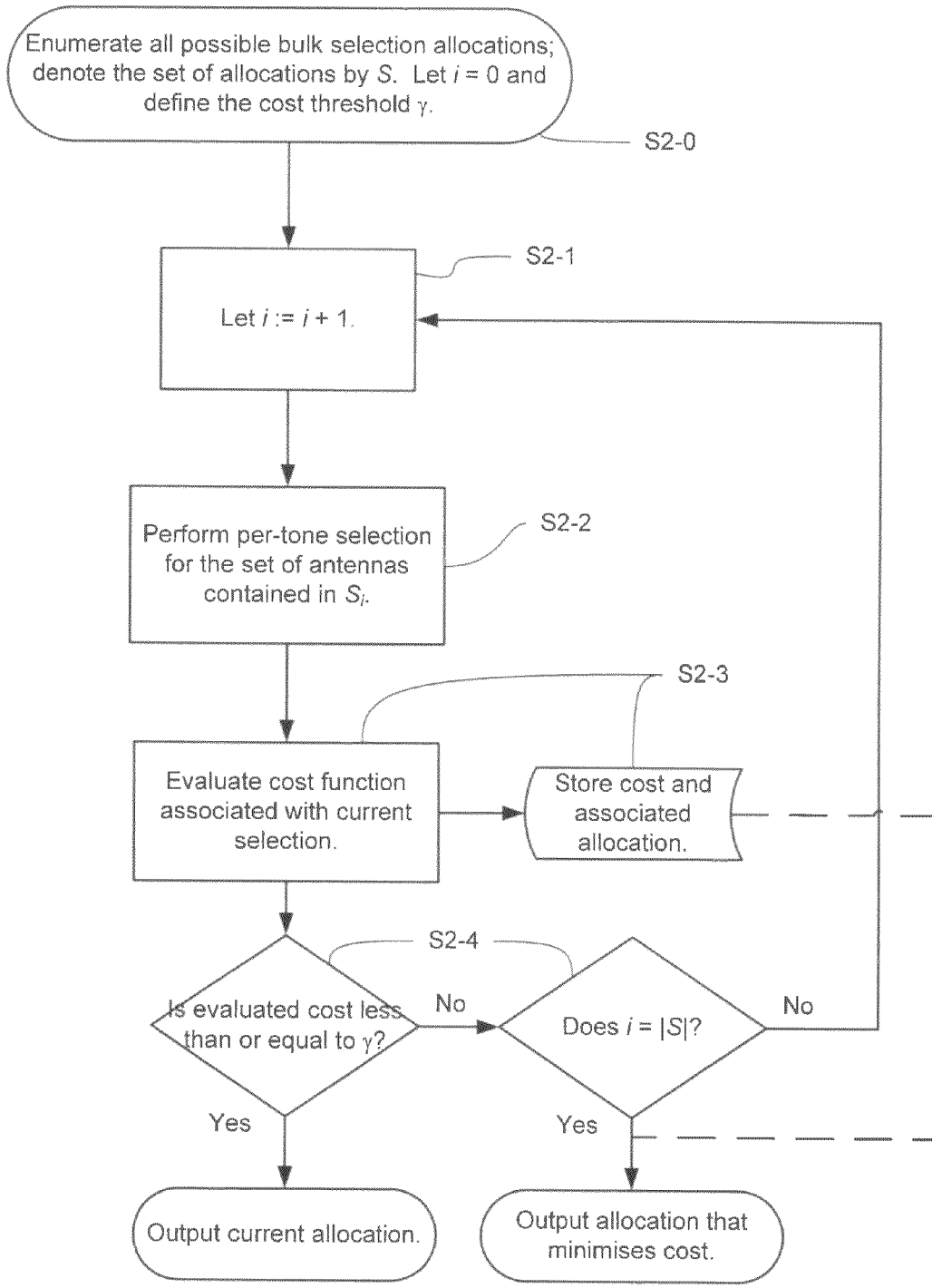
FIG. 8 is a flow diagram of a second embodiment of a joint bulk and per-tone selection procedure.

A second example is illustrated in FIG. 8. This is a joint bulk and per-tone selection to meet an objective. In this example, the transmitter performs bulk and per-tone selection according to the following procedure:
S2-0) Initialisation: Given L and M, enumerate the $$\binom{M}{L}$$

possible bulk selection allocations, and let the set of these allocations be denoted by S, writing the i th element of the set as $S_i$. Initialise i=0 and choose a cost threshold γ.
S2-1) Assign i=i+1.
S2-2) Perform per-tone selection for the set of antennas contained in $S_i$.
S2-3) Evaluate the cost function related to the selection performed in step S2-2 and log this value.
S2-4) If the cost is less than or equal to γ, then choose this allocation and stop. Otherwise, if i=|S|, stop and choose the allocation that minimises the cost function. Otherwise, go to step S2-1.

Figure 9:
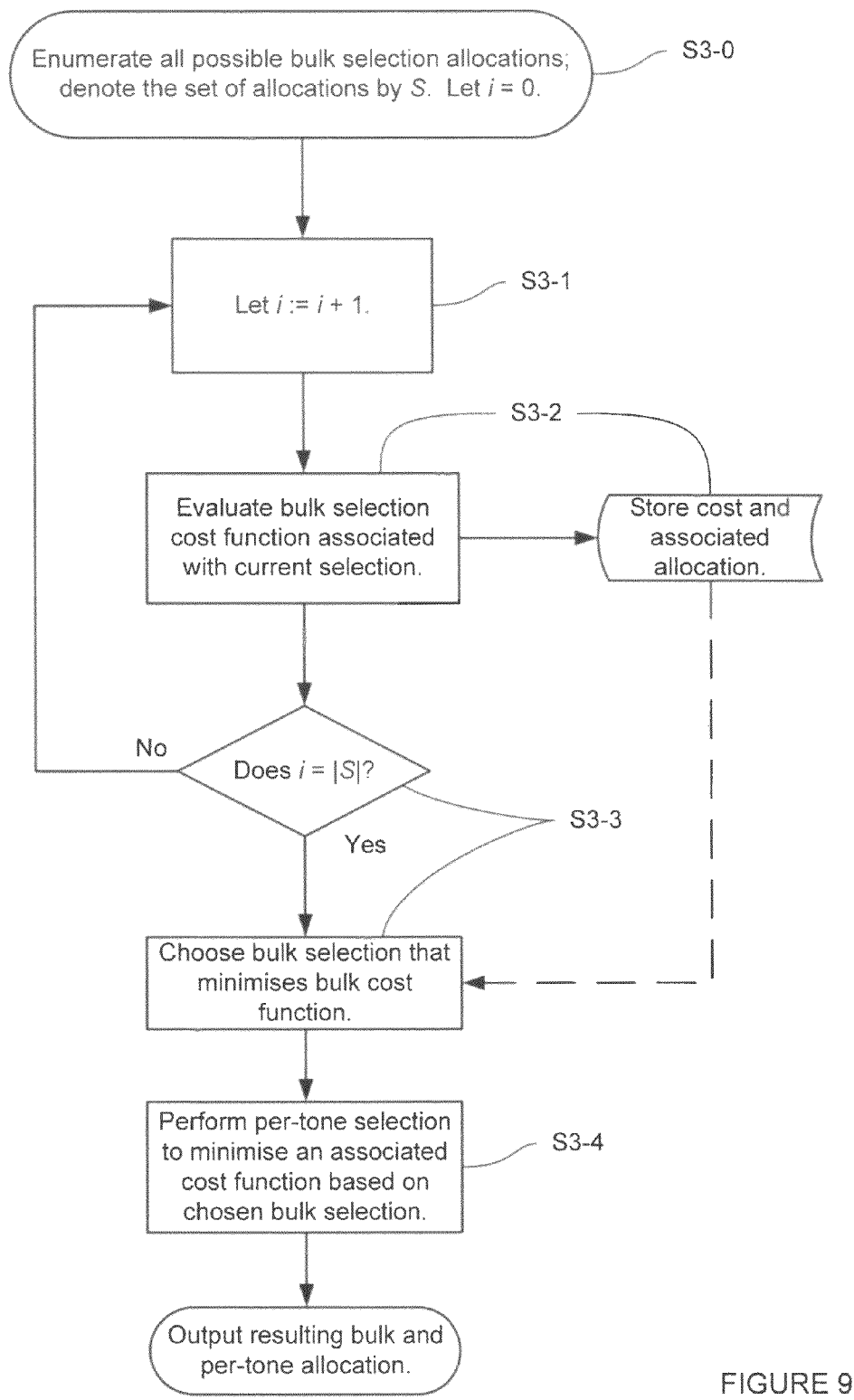
FIG. 9 is a flow diagram of a sequential bulk and per-tone selection procedure in accordance with the abovementioned embodiments.

A third example is illustrated in FIG. 9. In this example, an optimal sequential bulk and per-tone selection procedure is employed, according to the following procedure:
S3-0) Initialisation: Given L and M, enumerate the $$\binom{M}{L}$$

possible bulk selection allocations, and let the set of these allocations be denoted by S, writing the i th element of the set as $S_i$.
S3-1) Assign i=i+1.
S3-2) Evaluate the bulk selection cost function for the assignment defined by $S_i$ and log this value.
S3-3) If i=|S|, choose the bulk selection that minimises the associated cost function and go to step S3-4. Otherwise, go to step S3-1.
S3-4) Perform per-tone selection to minimise the chosen cost function for per-tone selection given the chosen bulk selection.

Figure 10:
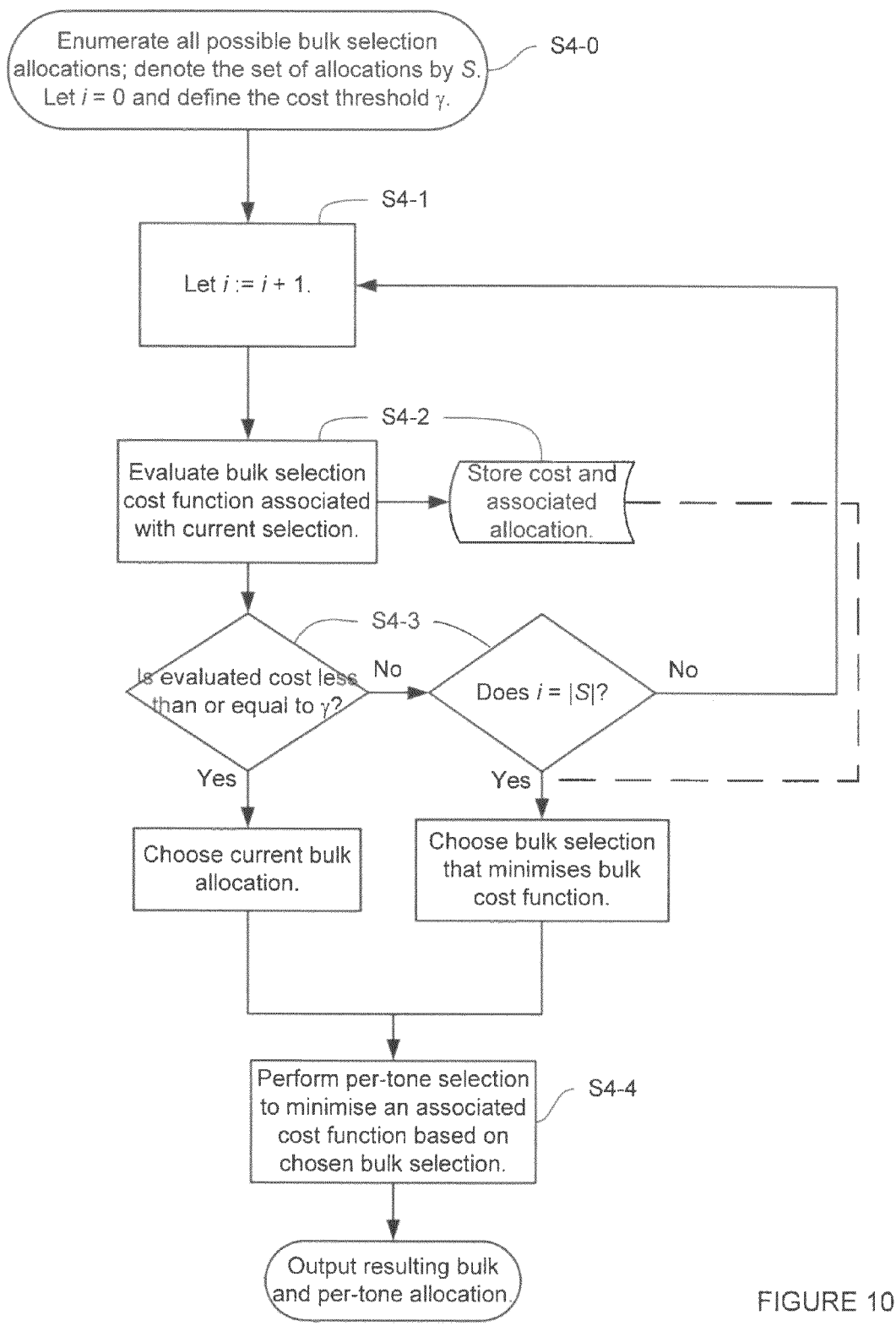
FIG. 10 is a flow diagram of a further sequential bulk and per-tone selection procedure.

A fourth example is illustrated in FIG. 10. In this example, a sequential bulk and per-tone selection process is used to meet a bulk selection objective. To do this, the transmitter performs bulk and per-tone selection according to the following procedure:

S4-0) Initialisation: Given L and M, enumerate the $$\binom{M}{L}$$

possible bulk selection allocations, and let the set of these allocations be denoted by S, writing the i th element of the set as $S_i$. Initialise a i=0 and choose a cost threshold γ.
S4-1) Assign i=i+1.
S4-2) Evaluate the bulk selection cost function for the assignment defined by $S_i$ and log this value.
S4-3) If the bulk cost is less than or equal to γ, then choose this allocation and go to step S4-4. Otherwise, if i=|S|, choose the allocation that minimises the bulk cost function and go to step S4-4. Otherwise, go to step S4-1.
S4-4) Perform per-tone selection to minimise the per-tone cost function given the chosen bulk selection.

The specific embodiments described above may, in certain implementations, seek to strike a balance between the hardware and processing complexity in a transceiver (in particular with regard to the number of RF chains required for transmission/reception) and the achievable performance of a system. This is accomplished by utilising only L of M available antennas, thus requiring only L RF chains, and selecting a suitable cost function that can be used to obtain a per-tone antenna allocation that achieves a performance that is significantly better than the conventional bulk selection process can attain.

For example, when bulk selection is employed, and two out of four antennas are chosen for transmission, only two RF chains are required, and physical (electronic) switches are used to route the transmit signal to the appropriate antennas. Typically, a multiplexing or other spatial encoding scheme is utilised in such a scenario. Thus, two transmit antennas are used, and two spatial streams are conveyed across the wireless medium to the receiver using all frequencies. This is the scenario as previously described with reference to FIG. 1.

It will be appreciated that this approach cannot achieve a diversity order of four unless certain space-time codes are employed, nor can it achieve as high of a coding gain as the case where all four transmit antennas are used and per-tone selection is employed (see, for example, the encoding scheme as illustrated in FIG. 2).

In fact, even when space-time coding is used, employing two out of four antennas with bulk selection, and a diversity gain of four is achieved, the coding gain is less than that of a per-tone selection scheme using all four antennas. Of course, the latter case requires four RF chains to achieve the desired performance.

By combining bulk selection and per-tone selection, a surprising advantage in performance is achieved, beyond that which might be anticipated by the mere combination of two encoding schemes. The specific examples demonstrate that improved performance in terms of diversity gain, coding gain and error rate can be achieved, while only requiring, for example, two out of four antennas to be used (i.e., only two RF chains). This result can be extrapolated to systems with higher numbers of antennas. In fact, it can be shown that only two RF chains are required to realise the performance of a per-tone system with any number of antennas. This result follows from the fact that, at high SNR, performance is dominated by the weakest channel over which data is conveyed, and the described arrangement may, in certain implementations thereof, be capable of performing antenna selection such that the gain of the weakest channel is maximised, provided that at least two RF chains are employed, in much the same way as can be done using per-tone selection.

Figure 11:
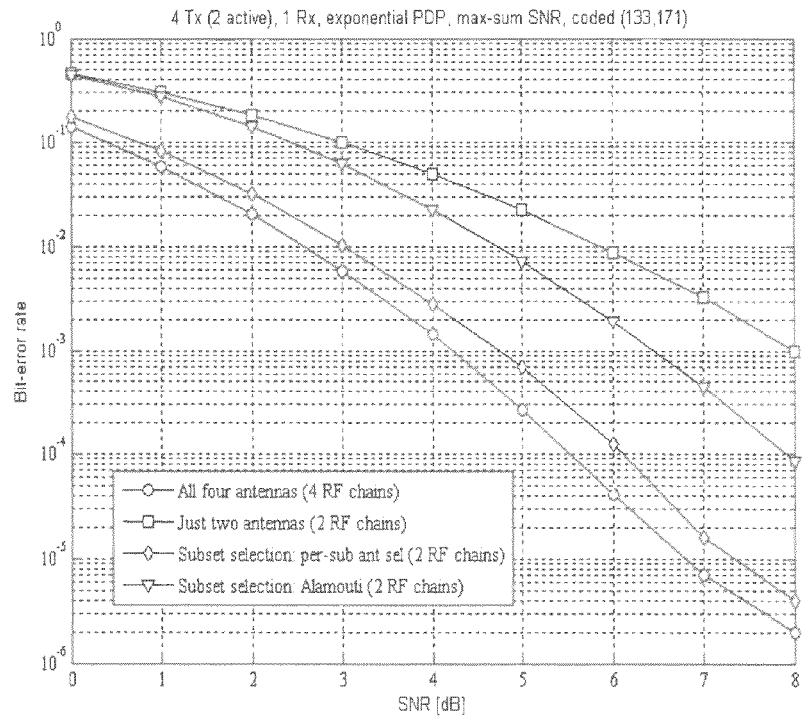
FIG. 11 is a graph illustrating results obtained from models of embodiments in comparison with other examples of antenna selection.

This result is illustrated for the example discussed here in FIG. 11. In this figure, BER is plotted against SNR for a system with four, or two, transmit antennas and one receive antenna employing a (133,171) convolutional code operating in a frequency-selective channel. The first system uses all four transmit antennas with per-tone selection (four RF chains). The second system uses two out of two transmit antennas (two RF chains) and per-tone selection. The third system employs bulk selection (two out of four antennas) using a max-sum SNR selection criterion, along with per-tone selection on the selected antennas, which corresponds to embodiments disclosed herein. The fourth system employs bulk selection (two out of four) using a max-sum SNR selection criterion, and spatially encodes the data on all subcarriers using an Alamouti space-time code.

Figure 12:
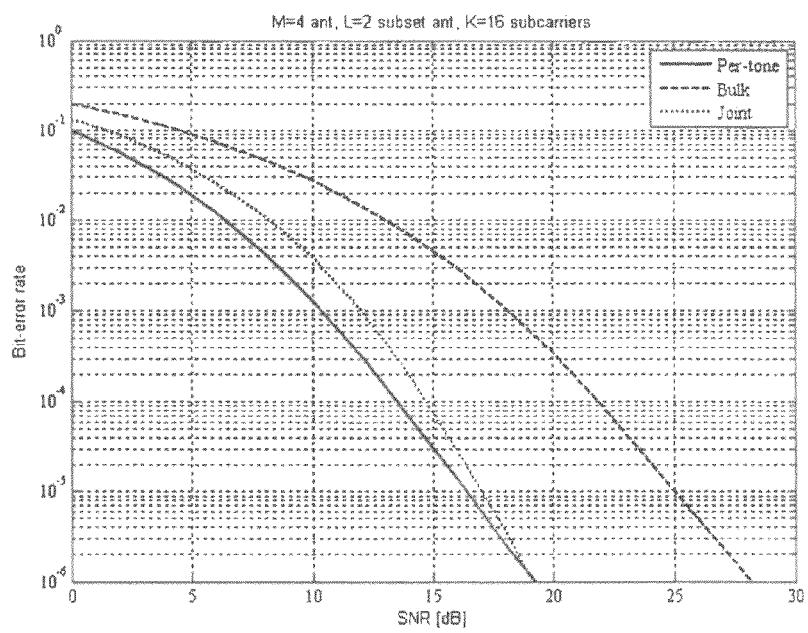
FIG. 12 is a graph of results of further comparisons between embodiments and other examples of antenna selection.

FIG. 12 shows, in further detail, a simple comparison between bulk antenna selection, per-tone antenna selection, and an example of the joint approach described herein. As can be seen most clearly from this graph, the coding gain achieved by adopting per-tone antenna selection, as opposed to bulk antenna selection, is substantial. Coding gain is illustrated by the distance between the respective lines on the graph, at high SNR.

Likewise, and more surprisingly, the joint approach benefits from the same (at high SNR) or near same (at mid-range SNR) coding gain over bulk antenna allocation. It might be expected that the coding gain would be diminished in some way by taking a hybrid approach, but this is not the case.

Moreover, diversity gain, which is measured as the slope of the respective lines on the graph at high SNR, is unaffected by the use of a hybrid approach. It will be known from the existing teaching in the field that diversity gain is not affected by the choice of antenna allocation.

The effective diversity gain d in the various circumstances can be expressed as:

$$d_{per-tone} \approx d_{joint} \approx d_{bulk}$$

The use of approximations here is merely to take account of run time errors, rather than any structural reason why diversity gain should vary from one approach to another. Equality is achieved in theory and if an infinite number of simulations were to be executed.

Further, the coding gain in the various circumstances is:

$$c_{per-tone} \approx c_{joint} >> c_{bulk}$$

That is, the coding gain is significantly higher when using per-tone antenna allocation than when using bulk allocation but also when using the joint approach disclosed herein. That is, it is surprising that limiting the number of RF chains available for use in per-tone antenna allocation has no material effect on performance.

When using one of the approaches described above, a periodic reassessment of channel state should be conducted. It is advantageous to control the frequency of this reassessment, trading off the currency of channel state information against the computational, energy and time cost of retrieving and processing channel state information.

In the context of a mobile communications application, it may be necessary to retrieve CSI frequently, such as per OFDM symbol. This is because the state of the channel can change frequently if one of the stations defining the channel is in motion, and particularly in rapid motion.

On the other hand, in an indoor application, a channel can remain stable for tens of milliseconds—a relatively long period in terms of the technology under discussion. Under such circumstances, a less frequent CSI update may be entirely acceptable.

While the per-tone allocation illustrated above suggests the allocation of contiguous blocks of subcarriers (each block containing the same number of subcarriers), this need not be the case. There may be operational reasons why particular blocks do not contain the same number of subcarriers. Moreover, blocks for allocation need not be contiguous, and there may be positive operational reasons not to define contiguous blocks. The particular design of blocks within a spectrum for per-tone allocation is not the subject of this disclosure.

The reader will appreciate, from the various points made on the subject, that the above described examples can be modified such that antenna allocation techniques are applied at the receiver rather than the transmitter. It will be recognised that such techniques could also be applied at both the receiver and the transmitter, though the practical benefit of doing this may not be readily apparent. In particular, the reader will appreciate that maximisation of received SNR and minimisation of BER can be achieved in such circumstances by performing maximum ratio combining.

The specific embodiments are presented schematically. The reader will appreciate that the detailed implementation of each embodiment can be achieved in a number of ways. For instance, a dedicated hardware implementation could be designed and built. On the other hand, a general purpose communications apparatus could be configured with a computer program, such as delivered either by way of a storage medium (e.g. a magnetic, optical or solid state memory based device) or by way of a computer receivable signal (e.g. a download of a full program or a "patch" update to an existing program). Besides these two positions, a multi-function hardware device, such as a DSP, a FPGA or the like, could be configured by configuration instructions.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless communications device, comprising:
   a plurality of antennas, wherein the device is configured to emit a frequency multiplexed signal from one or more of said antennas over a communications channel in use; and
   an antenna selector configured to:
   (i) identify, from said plurality of antennas, a prospective set of antennas for emitting said multiplexed signal;
   (ii) determine possible per-tone allocations for the prospective set of antennas,
   (iii) for each one of the possible per-tone allocations determined for the prospective set of antennas, evaluate a cost function and store results of evaluating the cost function;
   (iv) identify one or more different prospective sets of antennas from said plurality of antennas;
   (v) repeat steps (ii) and (iii) for each one of said different prospective sets of antennas in turn; and
   (vi) on the basis of the stored results, select, from the prospective sets of antennas and per-tone allocations, a single one of the prospective sets of antennas and per-tone allocations to use in emitting said signal.

2. The wireless communications device in accordance with claim 1, wherein said antenna selector is configured to receive channel state information and to perform antenna allocation on the basis of the received channel state information.

3. The wireless communications device in accordance with claim 2, wherein said antenna selector is configured to perform antenna allocation to optimize a performance-based objective.

4. The wireless communications device in accordance with claim 3, wherein said performance-based objective comprises any one of:
   minimizing the maximum bit error rate (BER) experienced over subcarriers defined in frequency over the channel;
   minimizing the BER per subcarrier;
   minimizing the average BER across the subcarriers;
   maximizing the minimum signal to noise ratio (SNR) over subcarriers;
   maximizing the SNR per subcarrier;
   maximizing the average SNR over subcarriers;
   maximizing the sum capacity over subcarriers;
   minimizing the error vector magnitude (EVM) of the signal after selection; and
   minimizing the peak-to-average power ratio (PAPR) of the signal after selection.

5. The wireless communications device in accordance with claim 1, wherein the device is configured to emit an orthogonal frequency division multiplexed signal.

6. The wireless communications device in accordance with claim 1, wherein said antenna selector is configured to perform, jointly, bulk antenna allocation to select a set of selected antennas, in number fewer than the total number of antennas, and per-tone allocation to said selected antennas.

7. A wireless communications device, comprising:
   a plurality of antennas, wherein the device is configured to receive a frequency multiplexed signal at one or more of said plurality of antennas over a communications channel in use; and
   an antenna signal selector configured to select, from the plurality of antennas, a set of antennas to use in processing of the received signal, said selector being configured to select said set of antennas by
      (i) identifying a prospective set of antennas, wherein the prospective set of antennas comprises more than one of said plurality of antennas;
      (ii) determining possible per-tone allocations for the prospective set of antennas;
      (iii) for each one of the possible per-tone allocations determined for the prospective set of antennas, evaluating a cost function and storing results of evaluating the cost function;
      (iv) identifying one or more different prospective sets of antennas from said plurality of antennas;
      (v) repeating steps (ii) and (iii) for each one of said different prospective sets of antennas in turn; and
      (vi) on the basis of the stored results, selecting, from the prospective sets of antennas and per-tone allocations, a single one of the prospective sets of antennas and per-tone allocations to use in processing said signal.

8. A method of allocating a frequency multiplexed signal to antennas of a multi antenna wireless communications device, comprising:
   (i) identifying, from said antennas, a prospective set of antennas for emitting said multiplexed signal;
   (ii) determining possible per-tone allocations for the prospective set of antennas;
   (iii) for each one of the possible per-tone allocations determined for the prospective set of antennas, evaluating a cost function and storing results of evaluating the cost function;
   (iv) identifying one or more different prospective sets of antennas from said plurality of antennas;
   (v) repeating steps (ii) and (iii) for each one of said different prospective sets of antennas in turn; and
   (vi) on the basis of the stored results, selecting, from the prospective sets of antennas and per-tone allocations, a single one of the prospective sets of antennas and per-tone allocations to use in emitting said signal.

9. A non-transitory computer readable storage medium comprising computer executable instructions operable to configure a general purpose programmable communications device to perform the method of claim 8.

10. A method of selecting use of antennas of a multi-antenna wireless communications device in receipt of a signal at said antennas, comprising:
   (i) identifying a prospective set of antennas, wherein the prospective set of antennas comprises more than one of said plurality of antennas;
   (ii) determining possible per-tone allocations for the prospective set of antennas;
   (iii) for each one of the possible per-tone allocations determined for the prospective set of antennas, evaluating a cost function and storing results of evaluating the cost function;
   (iv) identifying one or more different prospective sets of antennas from said plurality of antennas;
   (v) repeating steps (ii) and (iii) for each one of said different prospective sets of antennas in turn; and
   (vi) on the basis of the stored results, selecting, from the prospective sets of antennas and per-tone allocations, a single one of the prospective set of antennas and per-tone allocations for processing said signal.

11. A non-transitory computer readable storage medium comprising computer executable instructions operable to configure a general purpose programmable communications device to perform the method of claim 10.

* * * * *